Dec. 8, 1964  S. D. NOREM  3,159,996
HEATING APPARATUS FOR CHROMATOGRAPHIC COLUMN
Filed June 30, 1961
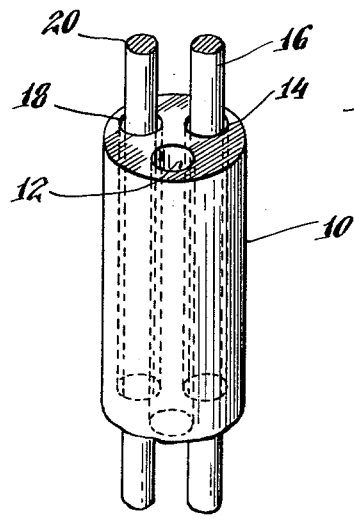
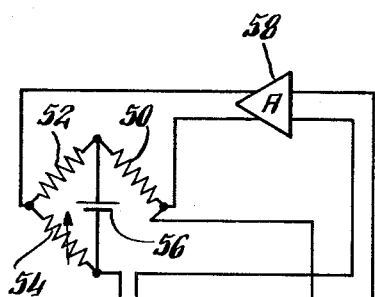
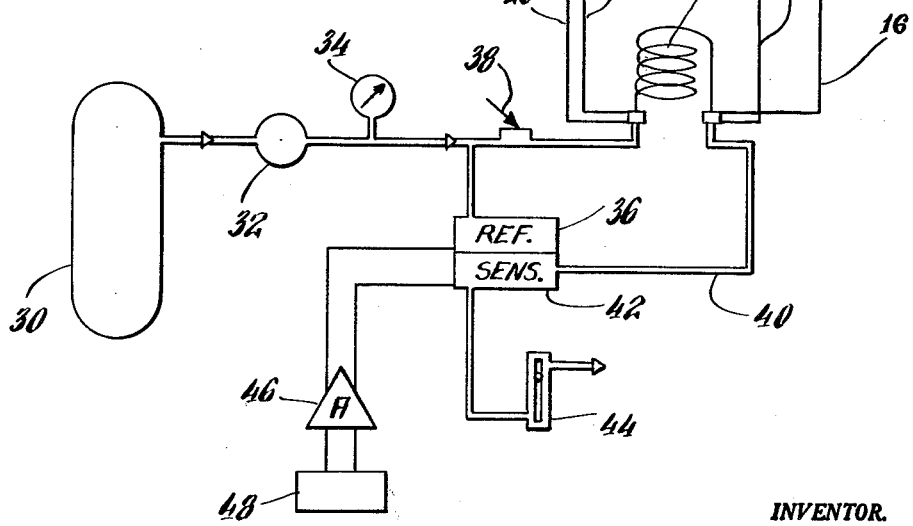
INVENTOR.
Stanley D. Norem
BY
Harold E. Bramblett Jr.
ATTORNEY.

United States Patent Office 3,159,996
Patented Dec. 8, 1964

3,159,996
HEATING APPARATUS FOR CHROMATOGRAPHIC COLUMN
Stanley D. Norem, Bayside, N.Y., assignor to The Perkin-Elmer Corporation, Norwalk, Conn., a corporation of New York
Filed June 30, 1961, Ser. No. 123,083
4 Claims. (Cl. 73—23.1)

This invention relates to vapor fractometer columns and, more particularly, to means for controlling the temperature of such a column.

In United States Patent 2,920,478 issude January 12, 1960 to Marcel J. E. Golay, there is disclosed a unique vapor fractometer column comprising an open passageway having its walls coated with a separating agent. This type column has become very successful and is widely known as a Golay column. Due to matters of expense and difficulty of fabrication, it is often desirable to manufacture such columns of glass. However, certain problems arise with glass Galoy columns that are not so evident in columns manufactured, for example, of stainless steel. One of these problems is related to the difficulty of applying uniform, fast, controlled heat to provide the temperature needed for certain types of analysis. This problem arises due to the poor "coupling" between the glass tube and an external heat source. The typical prior-art method of applying heat to a vapor fractometer column is to utilize a fluid bath at a controlled temperature. The disadvantage of this method is that large thermal masses are involved, which means that temperature changes occur at relatively slow rates and the possibility of thermal gradients exists.

It is therefore, the primary object of this invention to provide an improved apparatus for applying heat to tubing.

Another object is to provide an improved apparatus for applying heat to a fractometer column.

Another object is to provide such a column wherein thermal mass is kept to a minimum.

Another object is to provide such a column wherein column temperature is easily and accurately monitored.

Another object is to provide an improved temperature-programmed Golay column.

The manner in which the above objects are achieved will be more apparent from the following description, the appended claims, and the figures of the attached drawing wherein:

FIG. 1 illustrates a portion of a column manufactured in accordance with this invention; and FIG. 2 illustrates vapor fractometer apparatus having a Golay column temperature controlled in accordance with this invention.

The foregoing objects are achieved by utilizing a column having a plurality of bores. At least one of the bores contains an elongated heating element and at least another defines a vapor fractometer separating column.

More specifically, and by reference to FIG. 1, a column constructed in accordance with this invention may consist of a glass tube 10 having three parallel bores. A first bore 12 is essentially open and carries a coating of a suitable partitioning agent. It is thus adapted to function as a Golay separating column. A second bore 14 carries a fine heating wire 16 of suitable material and dimensions. The remaining bore 18 carries a resistance thermometer wire 20. In a preferred embodiment of this invention, the three bores of the tube are spaced equidistant from one another. With such an arrangement, the thermal relationship between bores 18 and 14 is equivalent to that between bores 12 and 14 so that resistance wire 20 will give an accurate reading proportional to the temperature of the separating column 12. Heat is applied to the column by passing an electric current through heater wire 16. The temperature of the column is measured and controlled by the resistance of wire 20. If the column itself is suspended in still air with on buried turns, thermal gradients will be negligibly small. The only thermal mass involved is that of the glass tube itself.

By means of the apparatus of this invention, the closest possible coupling between the heater and the column bore is obtained. This means that the column temperature may be easily, quickly, and precisely changed, and may also be closely controlled. The manner of constructing a column in accordance with this invention will be obvious to those skilled in the art. One such method, however, is to begin with a glass tube of approximately 4 feet in length and of ¼" diameter. Such a tube may contain three parallel bores; each bore being between 1 and 2 millimeters in diameter. The end of a heater wire is then inserted by hand into one bore and the end of a resistance wire is inserted in another. The glass tube is then drawn down by standard procedures in a suitable glass drawing apparatus to a suitble length nd diameter. The wires are fed from spools and are preferbly slightly kinked to allow for thermal expansion. The particular materials of which the wires are made are a matter of choice to those skilled in the art. A suitable heater wire, for example, may be Nichrome or nickel while the resistance wire may be of platinum or tungsten.

FIG. 2 illustrates vapor fractometer apparatus employing a column manufactured in accordance with this invention. A source of carrier gas 30 which may, for example, be helium is connected through suitable gas regulation means 32 to the input side of the system. A pressure gauge 34 indicates gas pressure. The reference side 36 of a detector cell is connected to the carrier supply. A sample injection point 38 may consist of any of the standard sample injection devices well known to those skilled in the art. The column 10 manufactured in accordance with this invention is provided in suitable flow relationship with the carrier and the contained sample. From the output of column 10 the gases flow through conduit 40 and through the sensing side 42 of the detector cell. From 42, the gases may be vented through a flow meter 44. A suitable amplifier 46 and a recorder 48 provide the desired output information.

In the embodiment illustrated in FIG. 2, the temperature of column 10 is automatically controlled. This is accomplished by making temperature-measuring resistance wire 20 one arm of a Wheatstone bridge that includes fixed resistors 50 and 52, variable resistor 54, and voltage source 56. The error voltage from the bridge is amplified by amplifier 58 and applied to heater wire 16. At the desired temperature, the resistance of temperature-measuring wire 20 is equal to the resistance of variable resistor 54. Thus, resistance 54 determines the temperature set point. It will be understood that resistor 54 may be either manually set or motor operated for programming purposes.

It is to be understood that the apparatus of this invention is capable of use for many different purposes and with many modifications. For example, it is not necessary that two wires be employed. If extremely accurate temperature monitoring is not required, it may be desirable to use a column with double bores and with only a heating wire. The single wire may also be used both for heating and for temperature measurement. Conversely, it may be desirable to use a larger number of bores to provide multiple columns, multiple heaters, or multiple temperature detectors. Furthermore, this invention is not limited to use with glass columns, or with Golay columns, but may be equally well adapted for use with columns of any material, and with packed columns. Furthermore, the tube may be of any convenient cross-sectional configuration. It is also not necessary that this invention be limited to vapor fractometer apparatus, but may be employed whenever it is desired to heat small tubes. This invention is limited only by the scope of the following claims.

I claim:

1. Vapor fractometer apparatus comprising a source of carrier gas; a glass tube having a plurality of bores, a first of said bores comprising a fractometer separating column having an unobstructed passage, the internal surface of which is of a material for which the different components of a sample have different affinities and at least a second of said bores containing a heating element; fluid passage means in fluid flow conducting relationship between said source of carrier gas and the inlet of said separating column; sample injection means for injecting a sample into said carrier gas; detector means at the outlet of said separating column for detecting the presence of sample components eluted from said column; and temperature control means connected to activate said heating element.

2. The apparatus of claim 1 wherein at least a third of said bores contains a temperature-sensitive element.

3. The apparatus of claim 2 wherein said temperature control means is responsive to said temperature-sensitive element.

4. The apparatus of claim 3 wherein said first, second, and third bores are symmetrically positioned about the longitudinal axis of said tube; said heating element comprises a heater wire; said temperature-sensitive element is a resistance wire; and said fractometer separating column is a Golay column.

References Cited in the file of this patent

UNITED STATES PATENTS

| 2,329,840 | Keinath | Sept. 21, 1943 |
| 2,615,215 | Stagner | Oct. 28, 1952 |
| 2,673,919 | Arvins et al. | Mar. 30, 1954 |
| 2,920,478 | Golay | Jan. 12, 1960 |

OTHER REFERENCES

Publication, Article by Drew et al., published in the text Vapor Chromatography by Desty, Butterworths Scientific Publications, London 1956, pages 213 through 219.